United States Patent [19]
Levy

[11] Patent Number: 5,033,758
[45] Date of Patent: Jul. 23, 1991

[54] COMPRESSIBLE CARRIER

[76] Inventor: Isy R. Levy, Apt. 406, 1015 33rd St., NW., Washington, D.C. 20007

[21] Appl. No.: 462,114

[22] Filed: Jan. 8, 1990

Related U.S. Application Data

[63] Continuation-in-part of Ser. No. 333,007, Apr. 4, 1989, abandoned.

[51] Int. Cl.$^5$ .............................................. B62B 3/02
[52] U.S. Cl. ................................... 280/35; 280/79.11; 211/201; 211/202; 248/419
[58] Field of Search ............... 280/638, 35, 79.3, 79.2, 280/79.11; 180/15; 108/54.1, 59; 211/201, 202; 248/419

[56] References Cited

U.S. PATENT DOCUMENTS

| | | | |
|---|---|---|---|
| 1,390,123 | 9/1921 | Gilfey et al. | 280/35 |
| 2,117,274 | 5/1938 | Buettell | 280/638 |
| 2,556,947 | 6/1951 | Smith | 280/35 |
| 2,645,538 | 7/1953 | Segal | 280/79.3 |
| 2,885,090 | 5/1959 | Forman et al. | 280/35 |
| 3,438,456 | 4/1969 | Hunter | 280/638 |
| 3,937,485 | 2/1976 | Shourek et al. | 280/35 |
| 3,955,511 | 4/1976 | Bak | 108/59 |
| 4,249,749 | 2/1981 | Collier | 280/35 |
| 4,297,795 | 1/1981 | Licari | 211/202 |
| 4,458,786 | 7/1984 | Lebre | 280/35 |

FOREIGN PATENT DOCUMENTS 0725935  4/1980  U.S.S.R. ............................ 280/35

Primary Examiner—David M. Mitchell
Attorney, Agent, or Firm—Richard C. Litman

[57] ABSTRACT

A compressible carrier wherein the carrier may be compressed or expanded in all three possible axial directions. The present invention provides a cart whose interior volume may be adjusted in three dimensions to accommodate variously shaped and sized items. The carrier may be altered axially both manually and by motors, both of which are described.

16 Claims, 6 Drawing Sheets

COMPRESSIBLE CARRIER

CROSS-REFERENCE TO RELATED APPLICATION

This present application is a continuation-in-part Application of patent application Ser. No. 07/333,007 filed Apr. 4, 1989 and now abandoned.

BACKGROUND OF THE INVENTION

1. Field of the Invention

The present invention relates to carts of a compressible and expandable nature. More specifically, the present invention relates to carts that are compressible and expandable in all three axial directions.

2. Description of the Prior Art

The area of compressible carts is relatively well defined. There are a number of cart arrangements that can be made smaller for storage and then expanded for use. Perhaps the most commonly recognized design is the two wheeled shopping basket that can be folded to a flat configuration.

U.S. Pat. No. 3,955,511 issued to W. L. Bak on May 11, 1976 is perhaps the most relevant patent to the present invention. However, the relevance is moderate at best. Bak discloses an appliance stand that can be adjusted in one axial direction. The length of the Bak cart can be changed to accommodate items of various sizes to be placed thereon.

However, when dealing with the area where the cart can be expanded in all three directions, there is little, if any, prior reference. As a result, the present invention offers a unique approach to compressible carriers. Its carrying volume can be adjusted in all three axial directions. That is, the height, length and width can be selectively adjusted to change the volumetric capacity of the carrier.

SUMMARY OF THE INVENTION

Thus, it is an object of the present invention to provide a carrier which can be expanded volumetrically in all three axial directions to accommodate any number of item sizes.

It is still another object of the present invention to provide a carrier that can be compressed to a significantly small volume to facilitate storage and transportation.

It is yet another object of the present invention to provide a compressible carrier that is lightweight so that the carrier can be carried by a person to the area of use.

It is another object of the present invention to provide a compressible cart that may include in its carrying location a storage bag. This bag could be useful to the grocery shopper. The carrier could hold a number of items without dropping any of them.

It is still another object of the present invention to provide motorizing means to various aspects of the present invention. Motorizing means could be used to extend the cart in any axial direction. In addition, a motor could be added to provide the cart with a self-propelling feature. The motorization of the cart would add convenience for the user.

With these and other objects in view which will more readily appear as the nature of the invention is better understood, the invention resides in the novel combination and arrangement of parts hereinafter more fully described and illustrated, with reference being made to the accompanying drawings.

BRIEF DESCRIPTION OF THE DRAWINGS

Similar reference characters designate corresponding parts throughout the various figures of the drawings.

DESCRIPTION OF THE PREFERRED EMBODIMENT

Figure 1:
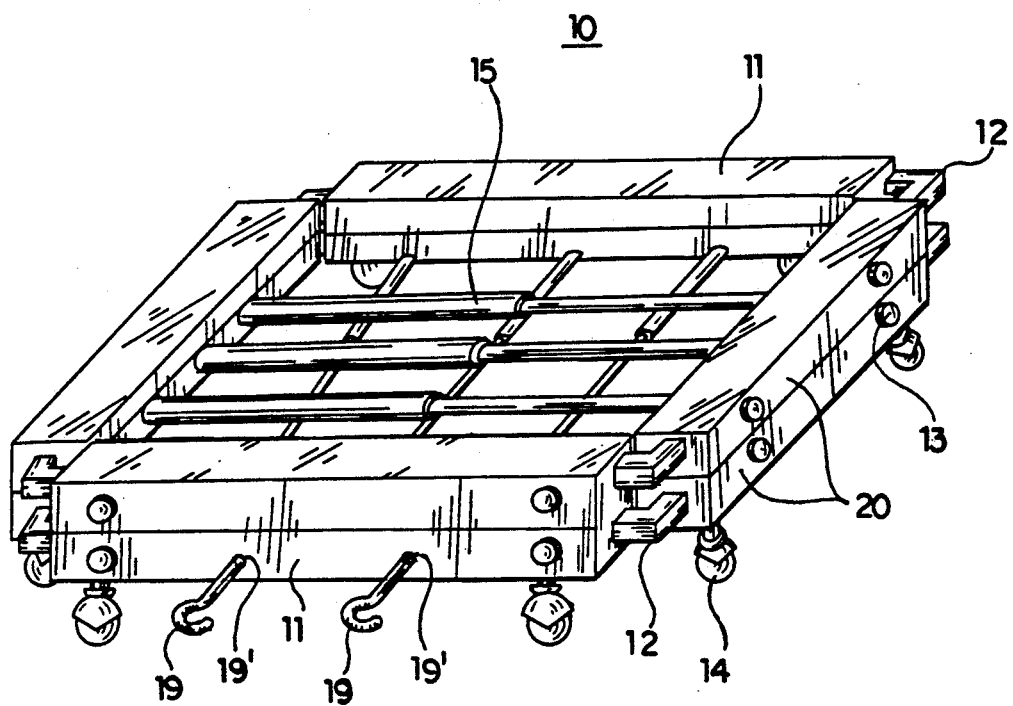
FIG. 1 is a perspective illustration of the carrier in the compressed mode of operation. This is the smallest volume to which the carrier may be compressed. As may be noted, the cart is small enough for convenient storage or transportation.

The compressible carrier is generally designated 10 in FIG. 1. In FIG. 1, the compressible carrier 10 is shown in is most compressed form.

The compressible carrier 10 contains essentially seven subcomponents arranged in a regular pattern. These seven subcomponents are:
1) side bar element 11;
2) corner angle 12;
3) tightening knob 13;
4) wheel and castor assembly 14;
5) telescoping base structural bar 15;
6) vertical scissor element 16; and
7) finite height adjustment track 17.

The construction of the present invention will be described first followed by a description of the method of operation.

CONSTRUCTION

There are eight side bar elements 11 associated with the compressible carrier 10 in the embodiment pictorially represented by FIG. 1. However, it should be noted at the outset that the compressible carrier 10 may have any number of side bar elements 11 including an odd number. The preferred embodiment is to produce a compressible carrier 10 with four sides, however, this does not preclude the creation of a compressible carrier 10 with any number of sides. The side bar elements 11 may be arranged to provide a compressible carrier 10 with either an even or odd number of overall sides. The side bar elements 11 are basically hollow parallelopipeds having openings at both of the longitudinal ends. Provided on the outside surface of the side bar elements 11 are two tightening knobs 13, one at each of the longitudinal ends. The tightening knobs 13 are simply knobs with screws attached thereto that penetrate the outside surface and protrude into the interior track of the side bar elements 11.

The interior track opens to the outside of the side bar elements 11 at each of the longitudinal ends. The interior track openings are shaped such that they can accept one end of a corner angle 12. The corner angles 12 are rigid bars bent at ninety degrees along their length. However, any angular configuration of the corner angles 12 may be selected. Each end of the corner angle 12 inserts into the interior track of a side bar element 11. As a result, the placement of a corner angle 12 between two side bar elements 11 will juxtapose the two side bar elements 11 at ninety degrees relative to one another. The tightening knobs 13 are then tightened to hold the corner angles 12 in place.

Four of the side bar elements 11 are connected via corner angles 12 such that they form a square or rectangle. In this arrangement, the tightening knobs 13 all face outward from the periphery of the rectangle. Two of these rectilinear members are required for the use of the compressible carrier 10. The combination of side bar elements 11 and corner angles 12 create a structural member 20. It can be seen that the compressible carrier 10 is essentially comprised of two structural members 20, one atop the other.

Figure 5:
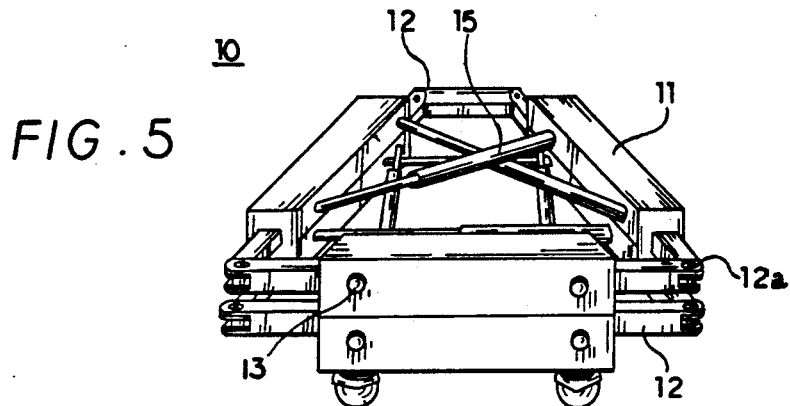
FIG. 5 is a perspective illustration of the carrier in an alternate embodiment where there are an odd number of sides to the overall cart.

Should the compressible carrier 10 be composed of a non-rectangular shape, as shown in FIG. 5, the corner angles 12 will have to be pivoted in order for the whole structure to expand. Pivot points 12a are provided on the corner joints of corner angles 12 so as to allow for the expansion of the side bar elements 11 and corner angles 12 in the various shapes that the compressible carrier 10 can assume.

Figure 2:
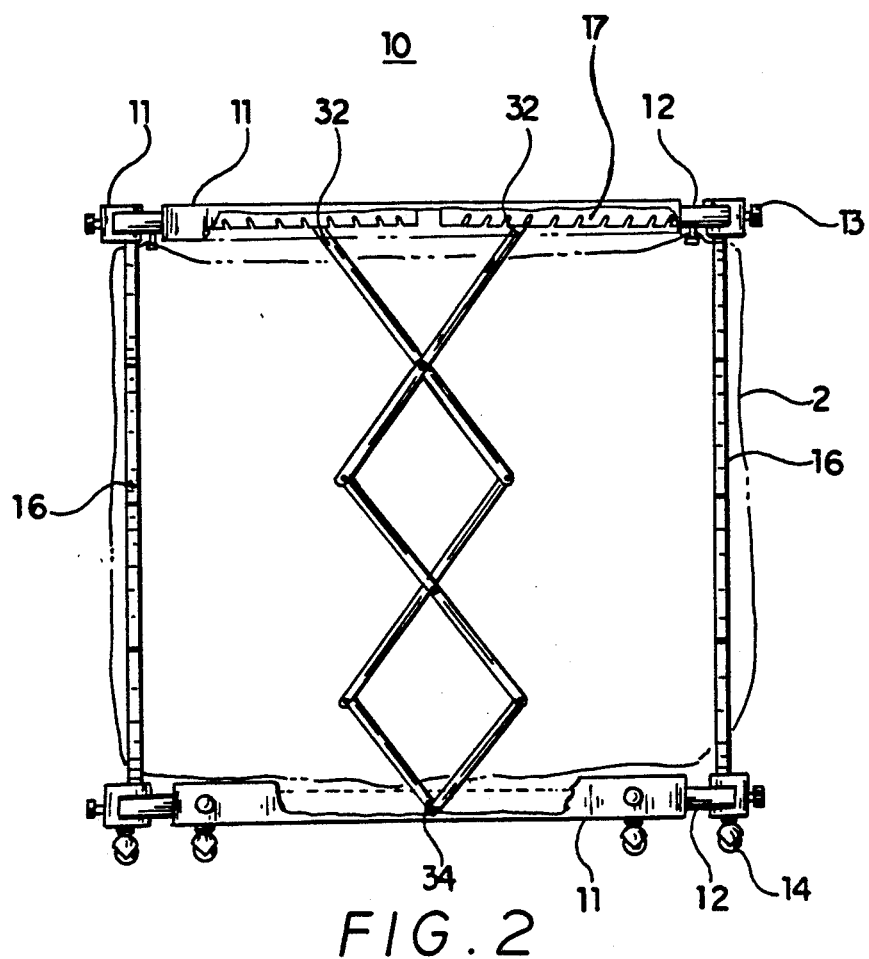
FIG. 2 is a side elevation illustration showing the vertical extension of the carrier. Also shown is the locking means that allows the carrier to retain its height after adjustment.
Figure 3:
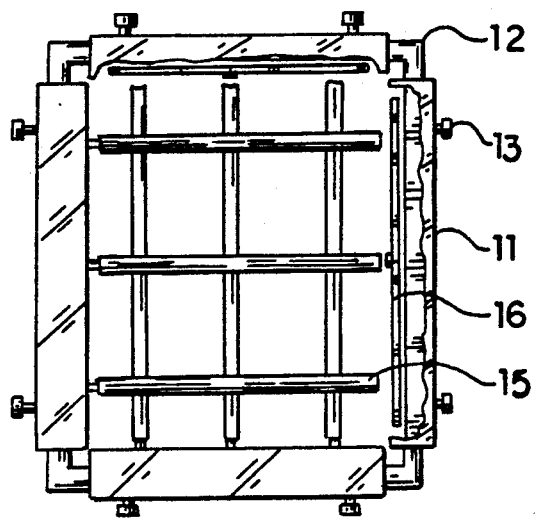
FIG. 3 is a top view illustration of the carrier. This elevation shows the carrier in its most compressed form.
Figure 4:
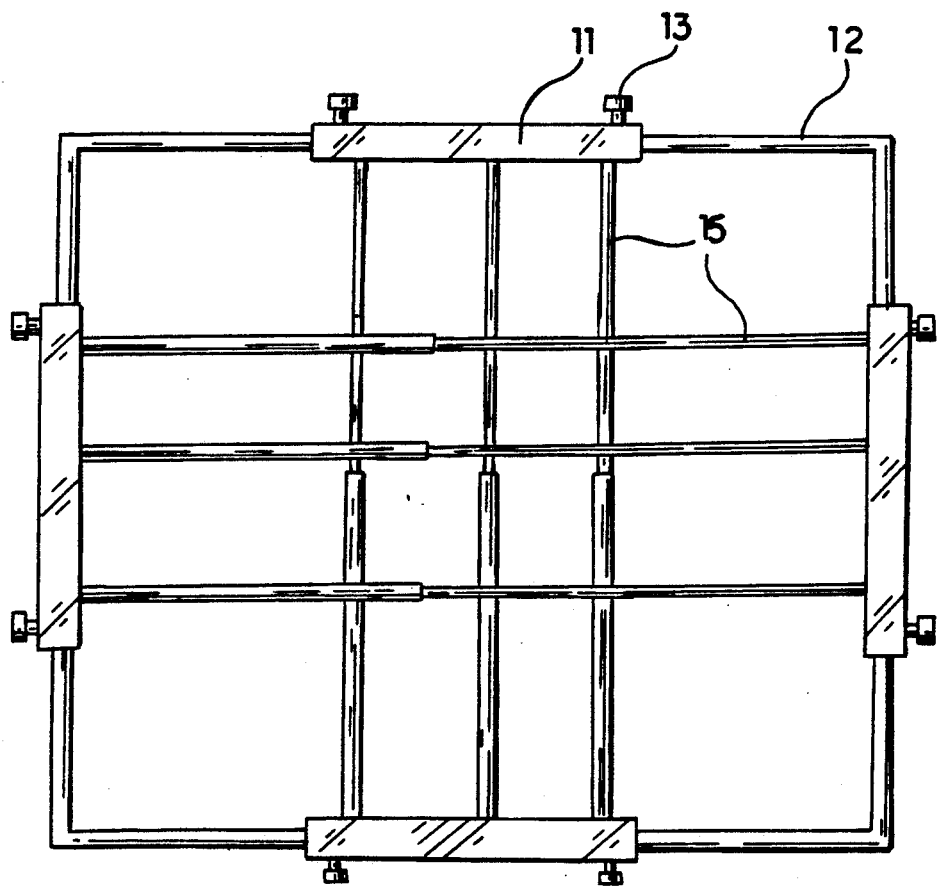
FIG. 4 is a top illustration much like FIG. 3. However, in this perspective, the cart is shown expanded to its largest extendible position. This figure is intended to provide a pictorial representation of the functionality of the carrier in reference to FIG. 3.
Figure 6:
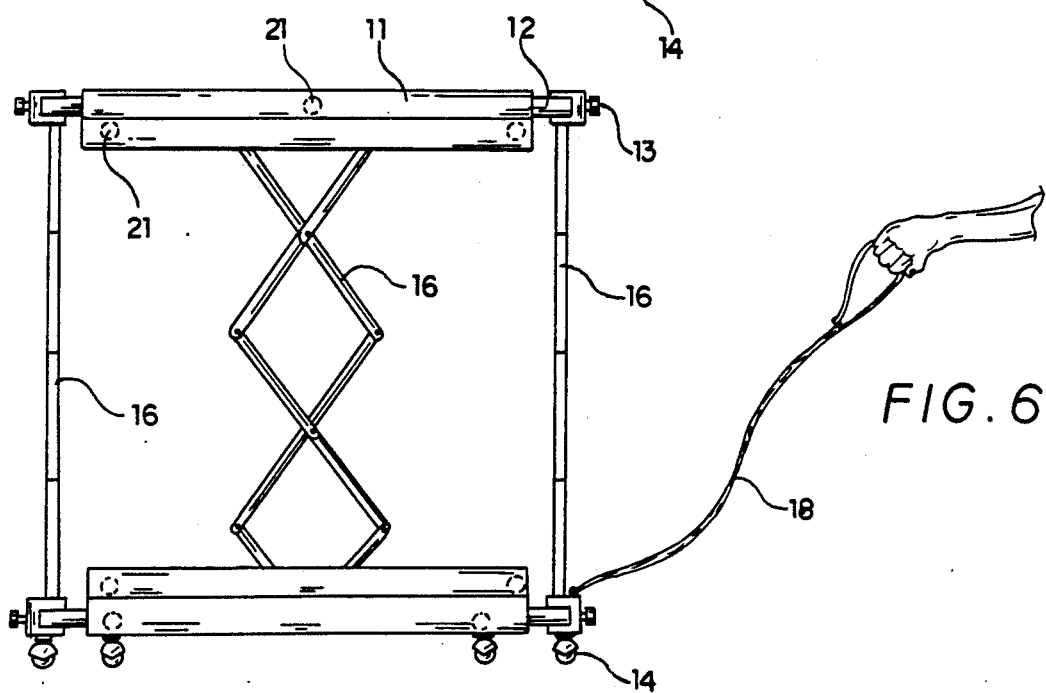
FIG. 6 is an illustration showing the possible placement of motors on the cart frame to facilitate operation of the cart.
Figure 9:
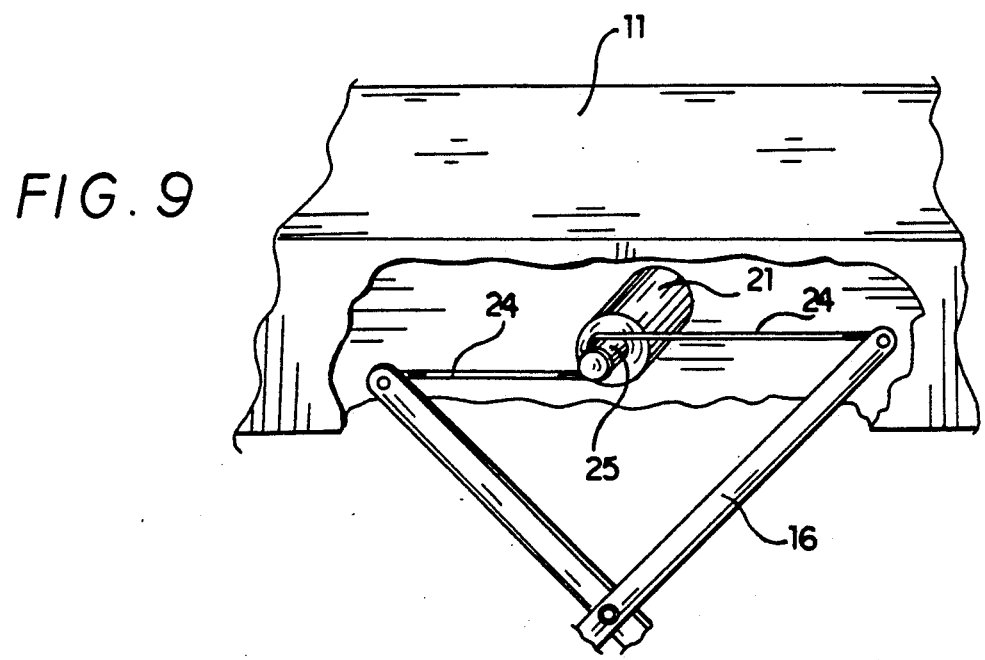
FIG. 9 is a close-up perspective of the possible position for mounting a motor to aid in the vertical extension of the compressible carrier.

The rectilinear members, when the carrier 10 is collapsed, will rest one on top of the other. Extending between these rectilinear members are vertical scissor elements 16. The vertical scissor elements 16 are simply the combination of several flat bars connected in a zig zag pattern. Due to the construction of the vertical scissor elements 16, they may be expanded or collapsed thereby increasing or reducing the vertical height of the compressible cart 10. One vertical scissor element 16 is associated with two side bar elements 11, one located atop the other. The respective top and bottom side bar elements 11 may be open on one side to accommodate scissor element 16 as shown in FIGS. 2 and 9. In FIGS. 2 and 6, scissor elements 16 are shown to be provided on each side of carrier 10 for stability of the upper structural member 20. It may also be possible to utilize telescoping bars 15 in the place of the vertical scissor elements 16. However, clearly, the collapsibility is somewhat reduced.

Within the upper of the two side elements 11, there is located a finite adjustment track 17. The finite adjustment track 17 is simply a specifically designed slot in the construction material. The slot contains upwardly projecting recessions within which the top most portion of the vertical scissor elements 16 may be rigidly inserted. The top most portion of the vertical scissor elements 16 slide into the grooves provided by the finite adjustment track 17 to hold the vertical scissor elements 16 in place. By holding the top of the vertical scissor elements 16 stationary, the height of the compressible carrier 10 is held rigid.

Wheel and castor assemblies 14 are provided at the longitudinal ends of the side bar elements 11. They are located on the bottom surface of the side bar elements 11. The wheel and castor assemblies 14 allow for pivotal and for rolling motion of the compressible cart 10.

Connecting the side bar elements 11 together, there is an additional feature, the telescoping base structural bars 15. Three base structural bars 15 extend from the inner surface of a side bar element 11 and extend to the side bar element 11 opposite. Thus, the telescoping structural base bars 15 form a cross-hatch pattern across the base of the compressible carrier 10. The telescoping structural base bars 15 are attached only to the side bar elements 11 located on the lower of the rectilinear members. Three telescoping structural bars 15 is the preferred number, however, any number of these bars 15 may suffice. Additionally, it may be possible to utilize scissor elements 16 in the lower structural member 20 as well. Should the compressible carrier 10 have an odd number of sides, it will be necessary to provide telescoping structural bars 15 that can be pivotally mounted to the lower structural member 20. Thus, as the compressible carrier 10 is enlarged, the telescoping structural bars 15 will be able to compensate.

The compressible carrier 10 may also be equipped with a carrying bag 2 that is placed within the volume defined by the cart 10. The bag 2 could be suspended from the inner surfaces of each of the corner angles 12 and the side bar element 11. The bag 2 would provide a carrier 10 that does not allow small items to fall out during movement. This adaptation may be of particular use in the grocery store.

In order to increase the transportability of the carrier 10, it is recommended that the apparatus 10 be composed of a lightweight material such as aluminum. It may be possible to construct the apparatus 10 of a rigid and strong plastic as well. However, it should be noted that the present invention is not limited to any particular material.

A strap 18 is provided for the compressible carrier 10 so that the user may pull the cart behind him/her. The strap 18 is attached to the compressible carrier 10 on the lower of the two structural members 20. The placement of the strap 18 in this location will provide the user with maximum leverage to pull the compressible carrier 10. Of course, the strap may also be attached to the upper structural member 20 if the need mandates such a design.

Removable hooks 19 are also provided on one of the sides of the compressible carrier 10. These hooks 19 may be used to facilitate storage of the compressible carrier 10. The hooks may be attachable either to the upper or the lower of the structural members 20. One possible use of the hooks 19 is to allow the user to attach the compressible carrier 10 to the exterior of a shopping cart in a grocery store. The hooks 19 may alternately be used to mount the compressible carrier 10 to a wall in the user's home. The hooks 19 are removable to prevent injury when the compressible carrier 10 is in use. The hooks 19 are simply screwed into the structural member 20 provided with the appropriately threaded female connective means 19.

Figure 8:
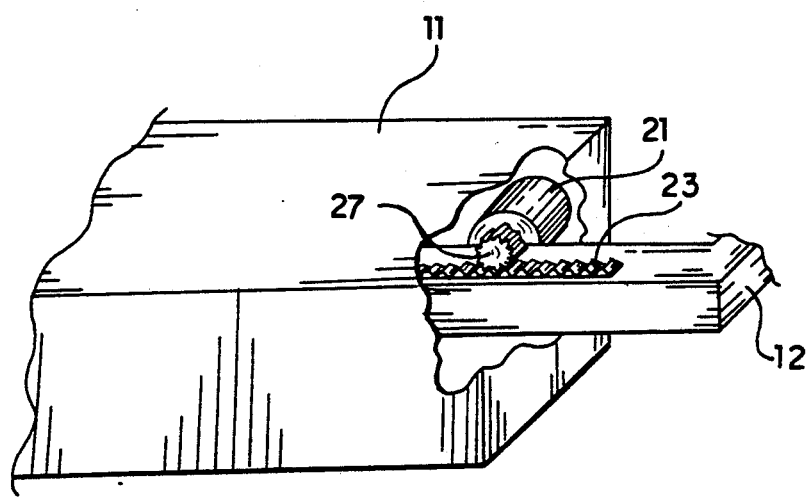
FIG. 8 is a close-up perspective of a possible method for mounting a motor within a side bar element. The motor would cause the corner angle to extend thereby extending laterally the compressible carrier.

The compressible carrier 10 may also be provided with electric motors 21 to automate the entire apparatus. The motors 21 would need to be placed in several locations. Primarily, one motor 21 may be placed at each end of the side bar elements 11. The placement of a motor 21 in each of these locations will allow extensible motion of the compressible carrier 10 in the lateral directions. The motors 21 could be provided with toothed gears 27 that would mesh with a toothed ridge 23 located on one of the sides of the corner angles 12 as shown in FIG. 8. Clearly, with the addition of motors to the structure, it is no longer necessary to include the tightening knobs 13. However, they may be provided to further enhance the structural rigidity of the compressible carrier 10. Alternative methods could be provided, and they will be obvious to those skilled in the art.

In order to provide vertically extensible motion, additional motors 21 must accompany the vertical scissor elements 16. Ideally, a motor 21 should be placed at the midpoint between the ends of the vertical scissor elements 16, as shown in FIG. 9. A cable 24 will extend from the ends of the vertical scissor elements 16 to a winding gear 25 attached to the shaft extending from the motor 21. If the cable 24 is threaded as shown, namely, that the cable will pull equally on each end of the vertical scissor element 16 with each rotation, then the vertical scissor element 16 will extend evenly and smoothly. Since motor 21 is attached to side bar element 11 in FIG. 9 the tension of cables 24 pulling on each upper end of the vertical scissor element 16 will determine the height of upper side bar element 11 and hence of upper structural member 20 relative to the lower structural member 20 as motor 21 is operated. Of course, the present invention is not limited solely to this particular arrangement. It will be obvious to those skilled in the art the possible alternative arrangements.

Figure 7:
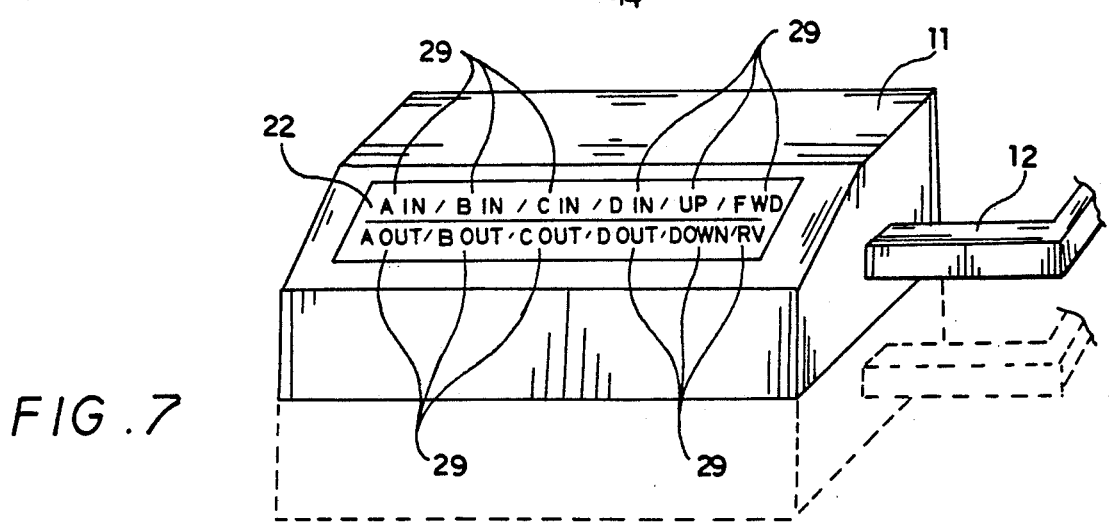
FIG. 7 is a perspective view of a possible embodiment of the control panel added to the apparatus should it be motorized.
Figure 10:
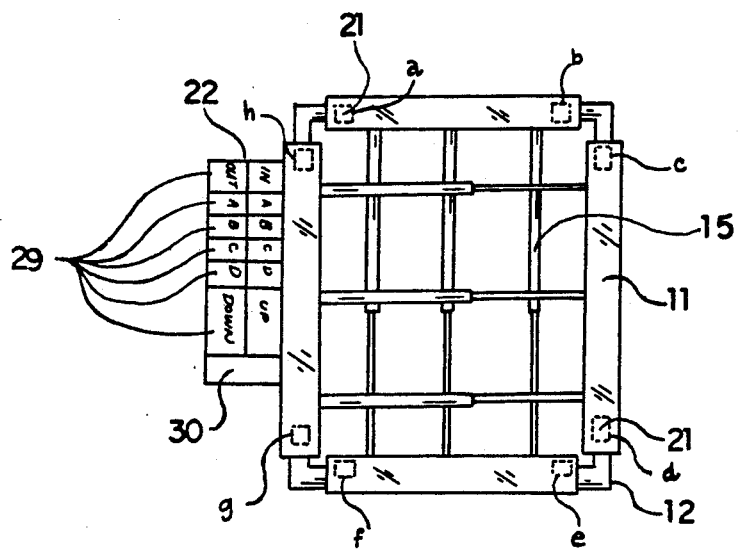
FIG. 10 is a top view of the compressible carrier showing the placement of the motors and control panel.

A control panel 22 will need to be adapted to the compressible carrier 10 if the apparatus is motorized. The control panel 22 is described pictorially in FIG. 7. The control panel 22 would ideally contain enough switches to control all of the motions that the compressible carrier 10 can make. FIG. 7 pictorially describes a control panel 22 having touch sensitive buttons 29. These touch sensitive buttons correspond to each of the possible motions. Each button would control and activate two of the motors 21 for the expanding or contracting of one the side bar elements 11, each motor 21 being on each of the two corner angles 12 that control the movement of that side bar element 11. FIG. 10 shows the layout for the motors 21a–h for the side bar elements 11a–d. Motors 21c and 21h would control the movement of sidebar 11a. The remaining side bar elements 11 would be controlled in a similar manner. The motors 21 that raise and lower would all operate at the same time so that the scissor elements 16 all move in unison.

Figure 11:
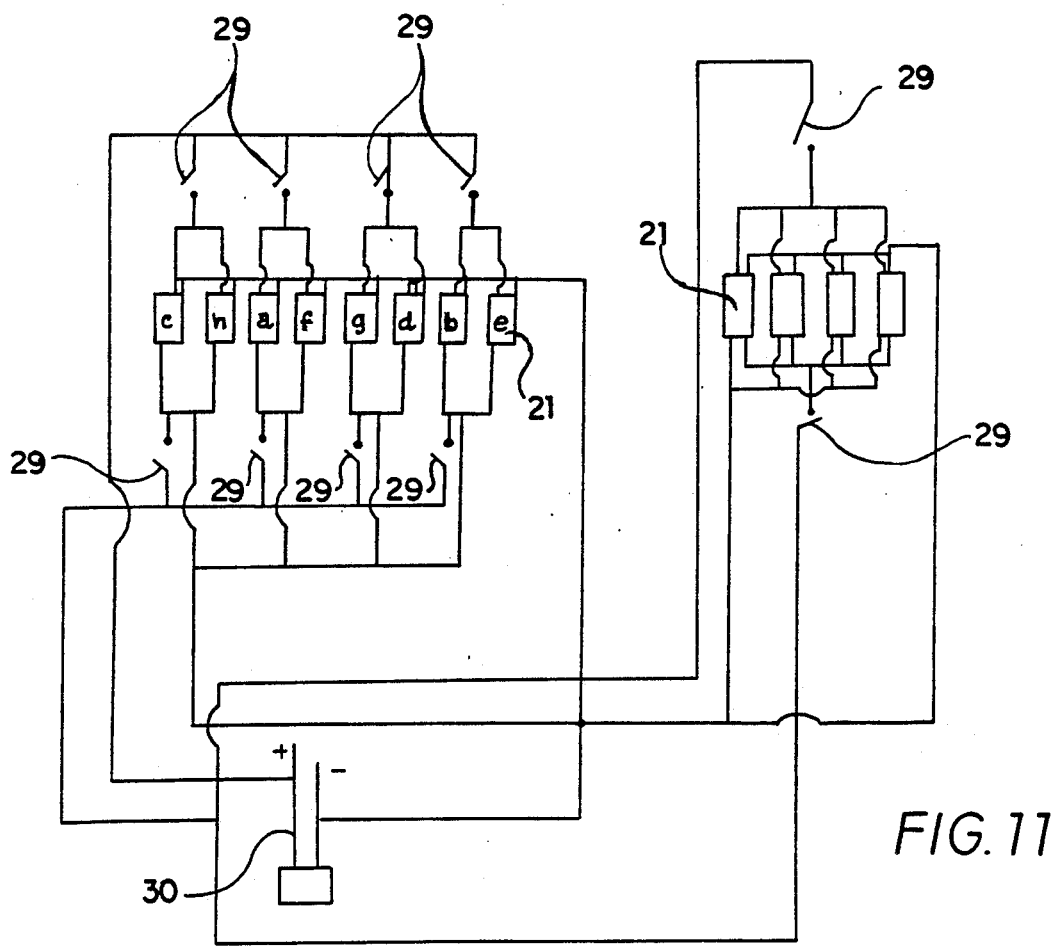
FIG. 11 is a circuit diagram for the control panel and motors.

Corner angles 12 could be constructed so as to be hollow for the purpose of accomodating the internal wiring that runs between the motors 21 and the control panel 22. Enough slack length should be provided to allow for the expansion of the whole structure 10. The control panel 22 would also contain a battery 30 to power all of the motors 21. FIG. 11 shows a circuit diagram for motors 21 and control panel 22.

OPERATION

In order to expand the width of the compressible cart 10, it is recommended that the cart 10 be reduced to its lowest height first. Following this, the tightening knobs 13 are released to loosen the appropriate corner angles 12. The sides can then be adjusted to suit the material to be carried. Once the side bar elements 11 are properly adjusted, the tightening knobs 13 are tightened to keep the corner angles 12 fixed in place.

The height of the carrier may now be adjusted. In order to raise the upper rectilinear member, simply grasp and pull. The vertical scissor elements 16 will expand thereby giving height to the compressible carrier 10. The top most portion of each of the scissor elements is provided with a catch knob 32 that is permanently within its respective finite adjustment track 17. By pushing the catch knob 32 into the recession of the finite adjustment track 17, the vertical scissor element 16 is held in place. To release the vertical scissor element 16, simply apply upwards pressure on the side bar elements 11. This will dislodge the catch knob 32 from the recession and allow the cart 10 height to be reduced or increased. The vertical scissor elements 16 are rigidly held in place in the lower of the rectilinear members by rivets 34. These rivets 34 allow flexible pivotal motion of the vertical scissor elements 16.

The operation of the compressible carrier 10 is significantly changed if motors 21 are added to the structure. For example, were it necessary to raise the height of the cart, the button 29 labeled "UP" would be depressed until the appropriate height were achieved. Were it necessary to extend on of the sides of the structural member 20, ideally that particular side would need be given a name. The sides could be labeled "A", "B", "C", and "D". The touch sensitive buttons could be labeled, for example, "A IN", "A OUT", etc. Thus, by pressing "A IN", the cart side A would move inwards until it reached its inner most position. The opposite would be achieved by pressing the "A OUT" button 29. Thus, full motility is provided through the addition of motors to the compressible carrier 10.

Figures 12, 13A, 13B, 13C:
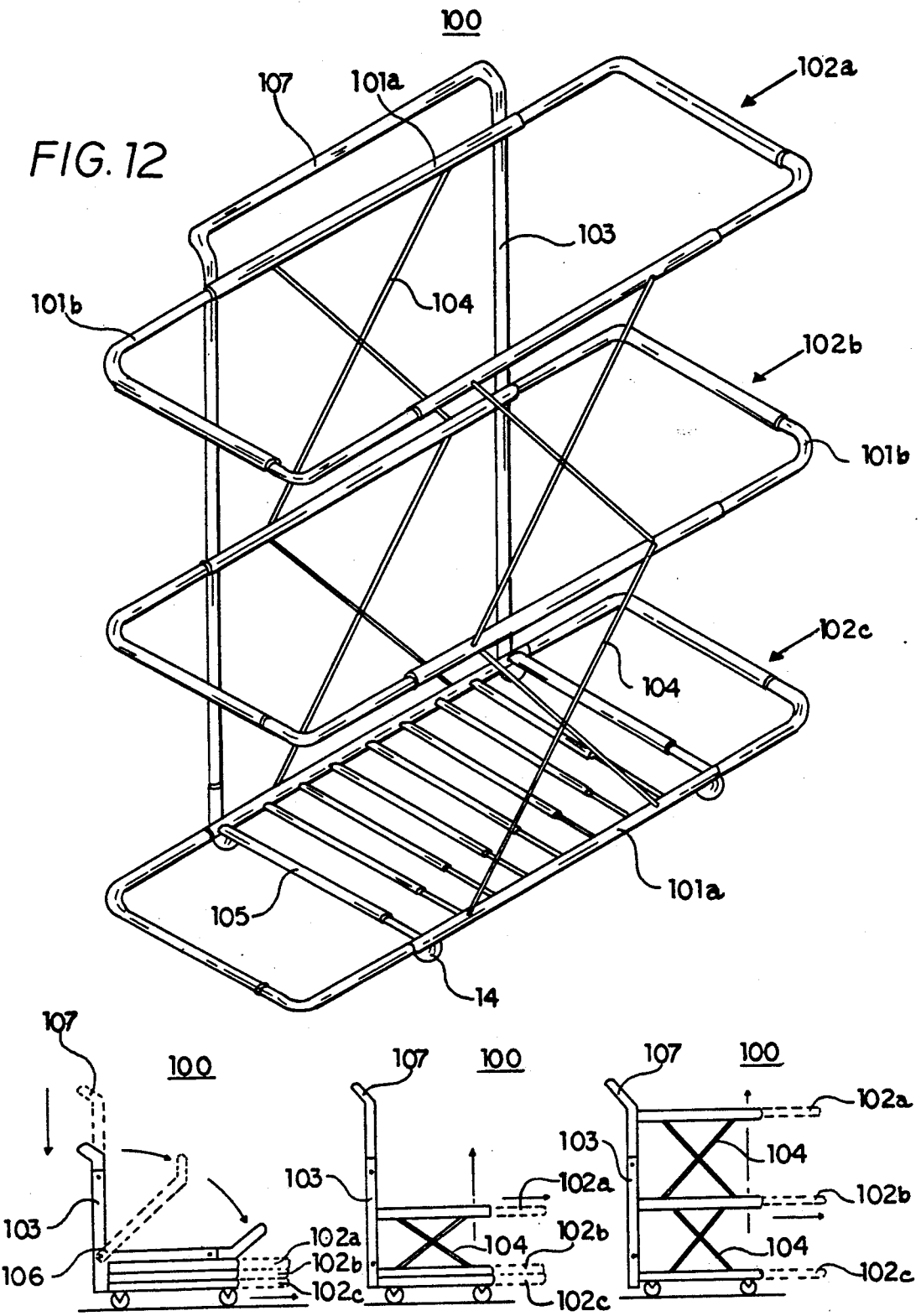
FIG. 12 is a perspective view of an alternate embodiment of the invention.
FIGS. 13a–13c are side views showing a step by step operation of the invention shown in FIG. 12.

An alternate form of the invention 100 is shown in FIG. 12, having a three tiered structure. It comprises a series of hollow, concentric, sliding tubes 101a that form the frame of the carrier 100. The tubes 101a are preferably made of aluminum for a minimum of weight. For each tier 102a, 102b, 102c, there are two parallel tubes 101a. There are four corner angle tubes 101b. Each tier 102a,b,c compresses in two dimensions. A vertical support 103 also comprises hollow, concentric, sliding tubes and compresses or expands the structure vertically as shown in FIGS. 13a–13c. Pivot 106 allows handle 107 to be folded down. The scissor elements 104 are again present and are shown schematically in FIGS. 12, 13B and 13C. They are connected to the bottom and top tiers 102c and 102a. On the lowest tier 102c, spaced in a parallel fashion, are a plurality of telescoping structural members 105. These are similar to telescoping members 15 in the previous embodiment 10. This embodiment 100 is simplified in that it lacks the motors 21 of previous embodiment 10 and relies on manual compression and expansion through the efforts of the user, but presents no difficulty due to the simplicity and lightness of the design. This removal of the motors serves to keep the weight of the carrier 100 to a minimum. The carrier 100 becomes truly portable due to its lightness and can be carried on board an aircraft when traveling.

It is to be understood that the present invention is not limited to the sole embodiments described above, but encompass any and all embodiments within the scope of the following claims.

I claim:

1. A carrier apparatus that can be expanded and compressed in at least two axial directions comprising:
    plural upper and plural lower elongated side bar elements having interior passageways formed longitudinally therethrough,
    corner angles, comprising two connected legs, slidably connecting said upper elongated side bar elements together and said lower elongated side bar elements together, respectively, forming upper and lower flat structural members,
    said corner angles being slidably engageable with the longitudinal ends of said upper and lower elongated side bar elements, respectively, to achieve expansion and compression in at least two axial directions,
    horizontally extensible means attached to and extending from the surface of said lower side bar elements inside the perimeter defined by said lower flat structural member connecting at least two of the inside surfaces of said lower side bar elements to one another, vertically extensible means attached to the lower of said side bar elements and extending between the upper of said side bar elements and the lower of said side bar elements allowing for the vertical extension of said carrier apparatus and
    wheel and castor arrangements on the bottom surface of said lower side bar elements allowing for the rolling of said carrier apparatus.

2. A carrier apparatus that can be expanded and compressed in at least two axial directions according to claim 1, wherein:
    one of said side bar elements contains threaded holes for the threaded engagement of hooks therein, and wherein said hooks allow for convenient storage of said apparatus.

3. A carrier apparatus that can be expanded and compressed in at least two axial directions according to claim 1, including:
    finite adjustment tracks within the upper of said side bar elements allowing for the rigid adjustment of the vertical height of said carrier apparatus by the removable engagement of the top most portion of said vertically extensible means in upwardly projecting recessions disposed along the length of said finite adjustment tracks.

4. A carrier apparatus that can be expanded and compressed in at least two axial directions according to claim 1, wherein:
    said corner angles being insertable into said interior passageways at the longitudinal ends of said side bar elements,
    tightening means engaging said corner angles are located on each of said side bar elements outside the perimeter defined by said side bar elements allowing for the removable holding of said corner angles while inserted within said side bar elements.

5. A carrier apparatus that can be expanded and compressed in at least two axial directions according to claim 1, wherein:
    said horizontally extensible means are telescoping structural base bars.

6. A carrier apparatus that can be expanded and compressed in at least two axial directions according to claim 1, wherein:
    said vertically extensible means are scissor elements.

7. A carrier apparatus that can be expanded and compressed in at least two axial directions according to claim 1, wherein:
    each of said structural members have four side bar elements connected by said corner angles wherein each structural member defines a rectangle,
    said horizontally extensible means are telescoping structural bars, and
    said telescoping structural bars are attached to the surfaces of said side bar elements within the perimeter defined by said structural member and connecting the inside surfaces of two of the side bar elements juxtaposed opposite one another.

8. A carrier apparatus that can be expanded and compressed in at least two axial directions according to claim 1, wherein:
    said structural members having an odd number of side bar elements connected by said corner angles whereby said structural members define a non-rectangular shape,
    said corner angles are constructed in two sections that are pivotally attached such that said corner angles can change their shape and angle as said side bar elements are displaced, and
    said horizontally extensible means being pivotally mounted to the surface of said side bar elements within the perimeter defined by said lower flat structural member.

9. A carrier apparatus that can be expanded and compressed in at least two axial directions according to claim 1, wherein:
    the angular bend of said corner angles being in accordance with the geometric shape of said structural members.

10. A carrier apparatus the can be expanded and compressed in at least two axial directions according to claim 1, wherein:
    a strap is attached to one of said structural members on one of said side bar elements allowing for the pulling of said apparatus for motive motion.

11. A carrier apparatus that can be expanded and compressed in at least two axial directions according to claim 1, wherein:
    first motor means are provided at each end of said side bar elements allowing for the lateral expansion of said apparatus,
    second motor means are provided along the region between the ends of said side bar elements in at least said upper flat structural member allowing for the vertical expansion of said apparatus, and
    said first and second motor means operable to drive said corner angles and said vertically extensible means, respectively.

12. A carrier apparatus that can be expanded and compressed in at least two axial directions according to claim 11, wherein said first motor means at the ends of said side bar elements further comprise:
    a toothed gear attached to a shaft extending from said first motor means,
    said toothed gear engaging a toothed track attached to one of said corner angles, and wherein the actuation of said first motor means is translated to an accompanying motion of said one corner angle thereby changing the lateral shape of said apparatus.

13. A carrier apparatus that can be expanded and compressed in at least two axial directions comprising:
  upper and lower elongated side bar elements having interior passageways formed longitudinally therethrough,
  corner angles, comprising two connected legs, slidably connecting said upper elongated side bar elements together and said lower elongated side bar elements together, respectively, forming upper and lower flat structural members,
  said corner angles being slidably engageable with the longitudinal ends of said upper and lower elongated side bar elements, respectively,
  horizontally extensible means attached to and extending from the surface of said lower side bar elements inside the perimeter defined by said lower flat structural member connecting at least two of the inside surfaces of said lower side bar elements to one another,
  wheel and castor arrangements on the bottom surface of said lower side bar elements allowing for the rolling of said carrier apparatus,
  vertically extensible means comprising a scissor element attached to the lower of said side bar elements and extending between the upper of said side bar elements and the lower of said side bar elements allowing for the vertical extension of said carrier apparatus,
  first motor means provided at each end of said side bar elements allowing for the lateral expansion of said apparatus,
  second motor means provided along the region between the ends of said side bar elements in at least said upper flat structural member allowing for the vertical expansion of said apparatus,
  said first and second motor means being operable to drive said corner angles and said vertically extensible means, respectively,
  a winding means attached to the end of a shaft extending from said second motor means, and
  a cable extending from said winding means to the ends of the scissor element enclosed by said upper side bar element, and wherein the actuation of said second motor means causes the winding and unwinding of said cable acting on said scissor element thereby changing the vertical position of said apparatus.

14. A carrier apparatus that can be expanded and compressed in at least two axial directions according to claim 11, wherein:
  a control panel is included, and
  switches are provided on said control panel to control said motor means that expand and compress said carrier in any of the axial directions.

15. A carrier apparatus that can be expanded and compressed in at least two axial directions according to claim 14, wherein:
  said switches are touch sensitive buttons, and
  said buttons contain indicia that indicate the motion that each of said buttons controls.

16. A carrier apparatus that can be expanded and compressed in at least two axial directions according to claim 1, wherein:
  a bag is suspended within the interior region defined by said structural members.

* * * * *